United States Patent [19]

Kimura et al.

[11] Patent Number: 5,771,223

[45] Date of Patent: Jun. 23, 1998

[54] METHOD OF RECEIVING ORTHOGONAL FREQUENCY DIVISION MULTIPLEXING SIGNAL AND RECEIVER THEREOF

[75] Inventors: Tomohiro Kimura, Kawachinagano; Yasuo Harada, Kobe; Hiroshi Hayashino, Takarazuka; Yasuhiro Uno, Katano, all of Japan

[73] Assignee: Matsushita Electric Industrial Co., Ltd., Osaka-fu, Japan

[21] Appl. No.: 621,338

[22] Filed: Mar. 25, 1996

[30] Foreign Application Priority Data

Mar. 27, 1995 [JP] Japan .................. 7-067771

[51] Int. Cl.$^6$ .................. H04B 7/204; H04J 11/00
[52] U.S. Cl. .................. 370/203; 370/343; 370/480
[58] Field of Search .................. 370/203, 204, 370/206, 207, 208, 210, 343, 480–497; 375/260

[56] References Cited

U.S. PATENT DOCUMENTS

| 5,274,629 | 12/1993 | Helard et al. | 370/50 |
| 5,406,551 | 4/1995 | Saito et al. | 370/19 |
| 5,450,456 | 9/1995 | Mueller | 375/224 |
| 5,519,692 | 5/1996 | Hershey | 370/18 |

FOREIGN PATENT DOCUMENTS 5-219006  8/1993  Japan .

OTHER PUBLICATIONS

Paul H. Moose, "Differential Modulation and Demodulation of Multi–Frequency Digital Communication Signals," IEEE Military Communications Conference, pp. 12.4.1–12.4.5, 1990.

H. Rohling & V. Engels. "Differential Amplitude Phase Shift Keying (DASPK)—A New Modulation method for DTVB," Int'l Broadcasting Conv., IEE, pp. 102–108, Sep. 1995.

Leonard J. Cimini, Jr., "Analysis and Simulation of a Digital Mobile Channel Using Orthogonal Frequency Division Multiplexing," IEEE Trans. on Comm., vol. COM-33, No. 7, pp. 665–675, Jul. 1985.

"A Digital Modulation Method for Terrestrial Digital Broadcasting Systems Using a Trellis Coded OFDM under Multipath Conditions", Masafumi Saito and Shigeki Moriyama, NHK Science and Technical Research Laboratories, vol. 47, No. 10, pp. 1374–1382 (1993).

*Primary Examiner*—Douglas W. Olms
*Assistant Examiner*—Matthew C. Phillips
*Attorney, Agent, or Firm*—Wenderoth, Lind & Ponack

[57] ABSTRACT

A Fourier transform circuit in a receiver performs a Fourier transform on a orthogonal frequency division multiplexing signal received through a transmission channel for each symbol to sequentially reproduce a received reference vector sequence and a received vector sequence. An interleave circuit interleaves elements of the received reference vector sequence and the received vector sequence. A memory stores the received reference vector sequence. A vector modulation circuit modulates the received reference vector sequence by respective signal point vectors representing each signal point to generate a modulation vector sequence for each symbol. A metric generation circuit then obtains a difference between the received vector sequence and the modulation vector sequence to generate the difference as a branch metric sequence. A trellis decode circuit reproduces a data sequence on the basis of the branch metric sequence.

4 Claims, 2 Drawing Sheets

METHOD OF RECEIVING ORTHOGONAL FREQUENCY DIVISION MULTIPLEXING SIGNAL AND RECEIVER THEREOF

BACKGROUND OF THE INVENTION

1. Field of the Invention

This invention relates to methods of receiving an orthogonal frequency division multiplexing signal and receivers thereof, and more particularly, the present invention relates to a method of receiving an orthogonal frequency division multiplexing signal and a receiver thereof for receiving, through a transmission channel, the orthogonal frequency division multiplexing signal formed by multiplexing a plurality of modulating waves, which are orthogonal to each other, for each symbol having a predetermined length, and maximum-likelihood-decoding a data sequence transmitted by a transmitting side.

2. Description of the Background Art

In recent years, communications using an orthogonal frequency division multiplexing (hereinafter referred to as OFDM) signal have been attracting attention in the areas of mobile digital sound broadcasting, digital terrestrial television broadcasting, and the like. This is due to the fact that the OFDM signal can transmit a large amount of data at a high speed, its characteristic is hardly degraded by a reflected wave even if there is no waveform equalizer, and its signal waveform is in a shape that is close to a random noise and, as a result, other services are not easily subjected to radio interference.

A transmission system using the OFDM signal is disclosed in "A Digital Modulation Method for Terrestrial Digital Broadcasting Systems Using a Trellis Coded OFDM under Multipath Conditions" written by Masafumi Saito and Shigeki Moriyama of NHK Science and Technical Research Laboratories, Transactions of Television Society Vol. 47, No. 10, pp. 1374 to 1382, Oct. 20, 1993, where it is discussed that trellis coding modulation is combined with the OFDM signal for improving a bit error rate characteristic.

FIG. 2 is a block circuit diagram showing the whole structure of a conventional system disclosed in the above prior art. In FIG. 2, a transmitter 100 and a receiver 200 are connected through a wire or radio transmission channel 300. The receiver 200 includes a Fourier transform circuit 210, an interleave circuit 220, a differential demodulation circuit 230, a metric generation circuit 250, and a trellis decode circuit 260. The differential demodulation circuit 230 includes a memory 231 and a division circuit 232.

Operation of the system shown in FIG. 2 is subsequently described. The transmitter 100 trellis-codes a data sequence which is to be transmitted to the receiver 200 so as to distribute the data sequence to any one of a plurality of signal points with a predetermined digital modulation scheme (16QAM, QPSK, for example), to generate a modulation vector $M_x(i, f)$ (i: an arbitrary symbol number, f: a frequency of a carrier to which the modulation vector $M_x$ is allotted). Next, the transmitter 100 multiplies the modulation vector $M_x(i, f)$ by a transmitted reference vector X(p, f) to generate a transmitted vector $X(i, f)=M_x(i, f)\cdot X(p, f)$ of the frequency f of the symbol i. The transmitted reference vector which is X(p, f) is a transmitted vector transmitted by a symbol p (which is regularly transmitted) precedent to the symbol i, and it represents references of amplitude and phase of the modulation vector Mx(i, f). Next, the transmitter 100 applies an interleave operation which interleaves elements of the transmitted vector sequence. The interleave operation is also applied to the transmitted reference vector sequence. Next, the transmitter 100 allots the transmitted vector X(i, f) of the whole frequency for each symbol to each of a plurality of carriers (528, for example) and applies the inverse Fourier transform to generate an OFDM signal x(t) of the symbol i in the time domain, and transmits the signal to the transmission channel 300.

When a transmission characteristic, including multi-paths of the transmission channel 300, is taken as h(t) and a noise added in the transmission channel 300 is represented by: taken as n(t), an OFDM signal y(t) received by the receiver 200 is $$y(t)=x(t)*h(t)+n(t).$$

wherein * represents a convolution operation.

The Fourier transform circuit 210 in the receiver 200 applies the Fourier transform to the OFDM signal y(t) in the time domain to generate a received vector sequence Y(i, f) (Y(i, f)=X(i, f)·H(i, f)+N(i, f)) in the frequency domain corresponding to the transmitted vector X(i, f). The Fourier transform circuit 210 also applies the Fourier transform to the symbol p to generate a received reference vector sequence Y(p, f) (Y(p, f)=X(p, f)·H(p, f)+N(p, f)) corresponding to the transmitted reference vector X(p, f). H(p, f) and H(i, f) are obtained by converting the transmission characteristic h(t) of the transmission channel 300 in the frequency domain. N(p, f) and N(i, f) are obtained by converting the noise n(t) in the frequency domain.

The interleave circuit 220 interleaves orders of the elements of the received reference vector sequence Y(p, f) and the received vector sequence Y(i, f) which are outputted from the Fourier transform circuit 210 to output the sequences. This is done so as to prevent an excess of error correction capability of the trellis decode circuit 260 by randomizing, at the receiver 200, a burst-like degradation of the transmission characteristic which is added at the transmission channel 300 through interleaving the elements. Although outputs from the Fourier transform circuit 210 and the interleave circuit 220 are different in the orders of their elements, the outputs from the interleave circuit 220 are also represented as the received reference vector sequence Y(p, f) and the received vector sequence Y(i, f), which are outputs of the Fourier transform circuit 210, as far as generality is not impaired.

The memory 231 in the differential demodulation circuit 230 holds, for a prescribed period, the received reference vector sequence Y(p, f) of the symbol p outputted from the interleave circuit 220, and outputs the received reference vector sequence Y(p, f) when the symbol i is received. For eliminating an influence by the transmission characteristic of the transmission channel 300, the division circuit 232 differential-demodulates by dividing the received vector sequence Y(i, f) by the received reference vector Y(p, f) to generate a demodulation vector sequence My(i, f) represented by the following equation (1).

$$My(i,f) = Y(i,f)/Y(p,f) \qquad (1)$$
$$= \frac{\{X(i,f)\cdot H(i,f)+N(i,f)\}}{\{X(p,f)\cdot H(p,f)+N(p,f)\}}$$

The characteristic H(i, f) of the transmission channel 300 is taken to have a small variation in time. Therefore, the characteristics at the time the symbol i and the symbol p are taken is the same, and thus H(i, f)=H(p, f)=H(f). Since generality is not impaired when the reference vector is taken as X(p, f)=1 and the noise N(i, f) is normalized with X(p, f), when X(p, f)=1, X(i, f)=Mx(i, f). Therefore, the demodulation vector sequence My(i, f) of the equation (1) is represented as the following equation (2).

$$My(i,f) = \frac{\{Mx(i,f) \cdot H(f) + N(i,f)\}}{\{H(f) + N(p,f)\}} \quad (2)$$

$$= Mx(i,f) + \frac{\{N(i,f) - Mx(i,f) \cdot N(p,f)\}}{\{H(f) + N(p,f)\}}$$

When a difference between the modulation vector sequence Mx(i, f) and the demodulation vector sequence My (i, f) is taken as an error vector sequence E(i, f), the error vector sequence E(i, f) is represented as the following equation (3).

$$E(i,f) = My(i,f) - Mx(i,f) \quad (3)$$

$$= \frac{\{N(i,f) - Mx(i,f) \cdot N(p,f)\}}{\{H(f) + N(p,f)\}}$$

The metric generation circuit 250 obtains, for each branch of trellis coding, a difference between the demodulation vector sequence My(i, f) outputted from the division circuit 232 and a signal point vector M(k) (k is a natural number not more than m (k=1, . . . , m) and m is a number of modulation scheme (in case of 16QAM, m=16)) which represents each signal point. The metric generation circuit 25, outputs the difference as a branch metric sequence BM(i, f, k) shown by the following equation (4).

$$BM(i,f,k) = My(i,f) - M(k) \quad (4)$$

$$= Mx(i,f) - M(k) + E(i,f)$$

The trellis decode circuit 260 performs trellis decoding on the basis of the branch metric sequence BM(i, f, k) outputted from the metric generation circuit 250 to reproduce decoded information that is most likelihood to the data sequence.

In the transmission channel, multi-paths may have an effect so as to cause fading and the transmission characteristic of some frequency may be almost 0. In the receiver 200 in FIG. 2, when {H(f)+N(p, f)} is close to 0, since the error vector sequence E(i, f) becomes an excessively large value in equation (3), because differential demodulation includes a division in {H(f)+N(p, f)}, a demodulation vector in which noise elements are amplified is outputted. Therefore, there has conventionally been a problem that a large error occurs in the branch metric sequence BM(i, f, k) to degrade decoding performance of trellis decoding.

SUMMARY OF THE INVENTION

Therefore, it is an object of the present invention to provide a method of receiving an orthogonal frequency division multiplexing signal, and a receiver thereof, which can prevent the increase of errors of a branch metric even if a transmission characteristic of a transmission channel is degraded.

A first aspect of the present invention is directed to a method of receiving an orthogonal frequency division multiplexing signal for receiving, through a transmission channel, an orthogonal frequency division multiplexing signal formed by multiplexing a plurality of modulating waves orthogonal to each other for each symbol having a predetermined length, and maximum-likelihood-decoding a data sequence transmitted by a transmitting side, wherein the transmitting side takes a transmitted vector sequence transmitted at a precedent symbol as a transmitted reference vector sequence representing its references of amplitude and phase, modulates the transmitted reference vector sequence by a transmitted modulation vector sequence which is trellis-coded so that the data sequence is distributed to any one of a plurality of signal points with a prescribed modulation scheme, and multiplexes the generated transmitted vector sequence as each of the modulating waves, thereby forming the orthogonal frequency division multiplexing signal, and comprising:

Fourier transforming on the orthogonal frequency division multiplexing signal received through the transmission channel for each symbol to reproduce a received vector sequence in a frequency domain corresponding to the transmitted vector sequence, storing a received reference vector sequence in the frequency domain corresponding to the transmitted reference vector sequence among the received vector sequences reproduced by the Fourier transforming step, modulating the received reference vector sequence stored by the storing step with respective signal point vectors representing each of the signal points to generate a modulation vector sequence for each symbol, generating a branch metric sequence by obtaining a difference between the received vector sequence generated by the Fourier transform step and the modulation vector sequence generated by the modulating step, and reproducing the data sequence by trellis decoding on the basis of the branch sequence generated by the metric generating step.

A second aspect of the present invention is directed to a receiver which is capable of receiving an orthogonal frequency division multiplexing signal through a transmission channel, wherein the orthogonal frequency division multiplexing signal is formed by multiplexing a plurality of modulating waves orthogonal to each other for each symbol having a predetermined length, and maximum-likelihood-decoding a data sequence transmitted by a transmitting side, wherein the transmitting side takes a transmitted vector sequence transmitted with a precedent symbol as a transmitted reference vector sequence representing its references for amplitude and phase, modulates the transmitted reference vector sequence by a transmitted modulation vector sequence which is trellis-coded so that the data sequence is distributed to any one of a plurality of signal points with a prescribed modulation scheme, and multiplexes the generated transmitted vector sequence as each of the modulating waves, thereby forming the orthogonal frequency division multiplexing signal, and comprising:

Fourier transform means for performing a Fourier transform on the orthogonal frequency division multiplexing signal received through the transmission channel for each symbol to reproduce a received vector sequence in a frequency domain corresponding to the transmitted vector sequence, storing means for storing a received reference vector sequence in the frequency domain corresponding to the transmitted reference vector sequence among the received vector sequences reproduced by the Fourier transform means, modulating means for modulating the received reference vector sequence stored by the storing means with respective signal point vectors representing each of the signal points to generate a modulation sequence for each symbol, generating means for generating a branch metric sequence by obtaining a difference between the received vector sequence generated by the Fourier transform means and the modulation vector sequence generated by the modulating means, and trellis decoding means for decoding data sequence on the basis of the branch sequence generated by the metric generating means.

According to the first and second aspects, since the received reference vector sequence is modulated with a signal point vector representing each signal point to generate the modulate vector sequence for each symbol, and the difference between the received vector sequence and the modulation vector sequence is obtained and its difference is generated as the branch metric sequence, no large error occurs in the branch metric sequence even if the transmission characteristic of the transmission channel is degraded, thereby preventing degradation of trellis demodulation capability.

In the first and second aspects, orders of elements of the received vector sequence and the received reference vector sequence may be interleaved. Since this randomizes the burst-like degradation of the transmission characteristic, the demodulation capability of trellis demodulation is exerted without exceeding error correcting ability.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
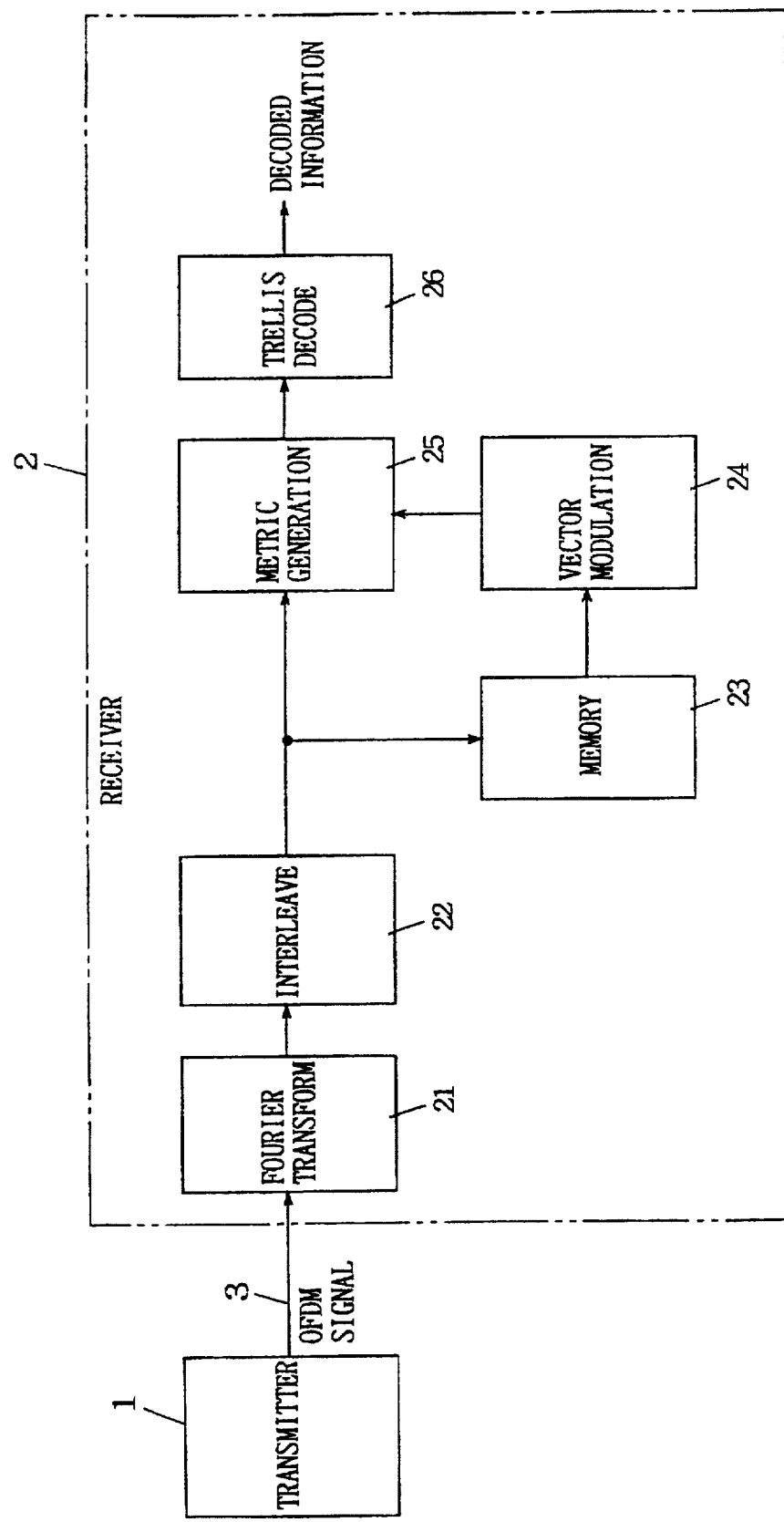
FIG. 1 is a block circuit diagram showing the whole structure of an example of one embodiment of the present invention.

An embodiment of the present invention is subsequently described referring to the drawings. FIG. 1 is a block circuit diagram showing the whole structure of an example of an embodiment of the present invention. In FIG. 1, a transmitter 1 and a receiver 2 are connected through a wire or radio transmission channel 3. The receiver 2 includes a Fourier transform circuit 21, an interleave circuit 22, a memory 23, a vector modulation circuit 24, a metric generation circuit 25 and a trellis decode circuit 26.

Operation of the system in FIG. 1 is subsequently described. The transmitter 1 trellis-codes a data sequence to be transmitted to the receiver 2 so as to distribute the data sequence to any one of a plurality of signal points with a prescribed digital modulation scheme (16QAM, QPSK, for example) so as to generate a modulation vector $M_x(i, f)$ (i: an arbitrary symbol number, f: a frequency of a carrier to which the modulation vector $M_x$ is allotted). Next, the transmitter 1 multiplies the modulation vector $M_x(i, f)$ by a transmitted reference vector $X(p, f)$ to generate a transmitted vector $X(i, f)=M_x(i, f) \cdot X(p, f)$. The transmitted reference vector which is $X(p, f)$ is a transmitted vector transmitted by a symbol p (which is regularly transmitted) precedent to the symbol i, and it represents references of amplitude and phase of the modulation vector $M_x(i, f)$. Next, the transmitter 1 applies an interleave operation which interleaves elements of the transmitted vector sequence. The interleave operation is also applied to the transmitted reference vector sequence. Next, the transmitter 1 allots the transmitted vector $X(i, f)$ of the whole frequency for each symbol to each of a plurality of carriers (528, for example) and applies the inverse Fourier transform to generate an OFDM signal $x(t)$ of the symbol i in the time domain. Next, the transmitter 1 performs a frequency conversion on the OFDM signal $x(t)$ from a base band to a transmission band of the transmission channel 3 to transmit the frequency-converted OFDM signal $x(t)$ to the transmission channel 3.

When a transmission characteristic, including multi-paths of the transmission channel 3, is taken as $h(t)$ and a noise added in the transmission channel 3 is taken as $n(t)$, an OFDM signal $y(t)$ received by the receiver 2 is represented by:

$$y(t)=x(t)*h(t)+n(t).$$

wherein * represents a convolution operation.

The receiver 2 performs a frequency conversion on the received OFDM signal $y(t)$ from the transmission band of the transmission channel 3 to the base band. The frequency converted OFDM signal $y(t)$ is inputted into the Fourier transform circuit 21. The Fourier transform circuit 21 performs the Fourier transform on the OFDM signal $y(t)$ in the time domain to generate a received vector sequence $Y(i, f)$ ($Y(i, f)=X(i, f) \cdot H(i, f)+N(i, f)$) in the frequency domain corresponding to the transmitted vector $X(i, f)$. The Fourier transform circuit 21 also performs the Fourier transform on the symbol p to generate a received reference vector sequence $Y(p, f)$ ($Y(p, f)=X(p, f) \cdot H(p, f)+N(p, f)$) corresponding to a transmitted reference vector $X(p, f)$. $H(p, f)$ and $H(i, f)$ are obtained by converting the characteristic $h(t)$ of the transmission channel 3 in the frequency domain. $N(p, f)$ and $N(i, f)$ are obtained by converting the noise $n(t)$ in the frequency domain.

The interleave circuit 22 interleaves orders of the elements of the received reference vector sequence $Y(p, f)$ and the received vector sequence $Y(i, f)$ which are outputted from the Fourier transform circuit 21 to output the sequences. This is done so as to prevent an excess of error correction capability of the trellis decode circuit 26 by randomizing, at the receiver 2, a burst-like degradation of the transmission characteristic which is added at the transmission channel 3 through interleaving the elements. As a result, the decoding performance of trellis decoding can be exerted without the excess of error correction capability. Although outputs from the Fourier transform circuit 21 and the interleave circuit 22 are different in orders of their elements, the outputs from the interleave circuit 22 are also represented as the received reference vector sequence $Y(p, f)$ and the received vector sequence $Y(i, f)$, which are outputs of the Fourier transform circuit 21, as far as generality is not impaired.

The memory 23 holds for a prescribed period, the received reference vector sequence $Y(p, f)$ of the symbol p outputted from the interleave circuit 22, and outputs the received reference vector sequence $Y(p, f)$ when the symbol i is received. The vector modulation circuit 24 modulates the received reference vector sequence $Y(p, f)$ for each branch of trellis decoding by a signal point vector $M(k)$ (k is a natural number not more than m, m is a number in a modulation scheme) to output a modulation vector sequence $Y(p, f) \cdot M(k)$.

The metric generation circuit 25 obtains a difference between the received vector sequence $Y(i, f)$ and the modulation vector sequence $Y(p, f) \cdot M(k)$ to output the difference as a branch metric sequence $BM(i, f, k)$ as shown in equation (5), as follows:

$$\begin{aligned} BM(i,f,k) &= Y(i,f) - Y(p,f) \cdot M(k) \\ &= X(i,f) \cdot H(i,f) + N(i,f) - M(k) \cdot X(p,f) \cdot \\ &\quad H(p,f) - M(k) \cdot N(p,f) \end{aligned} \quad (5)$$

The characteristic $H(i, f)$ of the transmission channel 3 is taken to have a small variation in time. Therefore, the characteristics at the time of the symbol i and the symbol p are taken is the same, and thus $H(i, f)=H(p, f)=H(f)$. Since the generality is not impaired when the reference vector is taken as $X(p, f)=1$ and the noise $N(i, f)$ is normalized with $X(p, f)$, the branch metric sequence $BM(i, f, k)$ in equation (5) is represented in equation (6) as follows:

$$BM(i,f,k) = Mx(i,f) \cdot H(f) + N(i,f) - M(k) \cdot H(f) - M(k) \cdot N(p,f) \quad (6)$$
$$= \{Mx(i,f) - M(k)\} \cdot H(f) + N(i,f) - M(k) \cdot N(p,f)$$

The trellis decode circuit 26 performs trellis decoding on the basis of the branch metric sequence $BM(i, f, k)$ outputted from the metric generation circuit 25 to reproduce and output decoded information that is most likelihood to the data sequence.

The received vector sequence $Y(i, f)$ is obtained by adding the effects of the characteristic of the transmission channel 3 and the noise to the transmitted vector $X(i, f)$. The transmitted vector $X(i, f)$ is obtained by multiplying the modulation vector $Mx(i, f)$ distributed to any one of a plurality of the signal points by the transmitted reference vector $X(p, f)$. On the other hand, the modulation vector sequence $Y(p, f) \cdot M(k)$ is obtained by multiplying the received reference vector sequence $Y(p, f)$, which is obtained by adding the effects of the characteristic of the transmission channel 3 and the noise to the transmitted reference vector $X(p, f)$, by the signal point vector $M(k)$ which represents each signal point.

In branch metric $BM(i, f, k)$ of the equation (6), the terms attributed to the noise are $\{N(i, f) - M(k) \cdot N(p, f)\}$.

Figure 2:
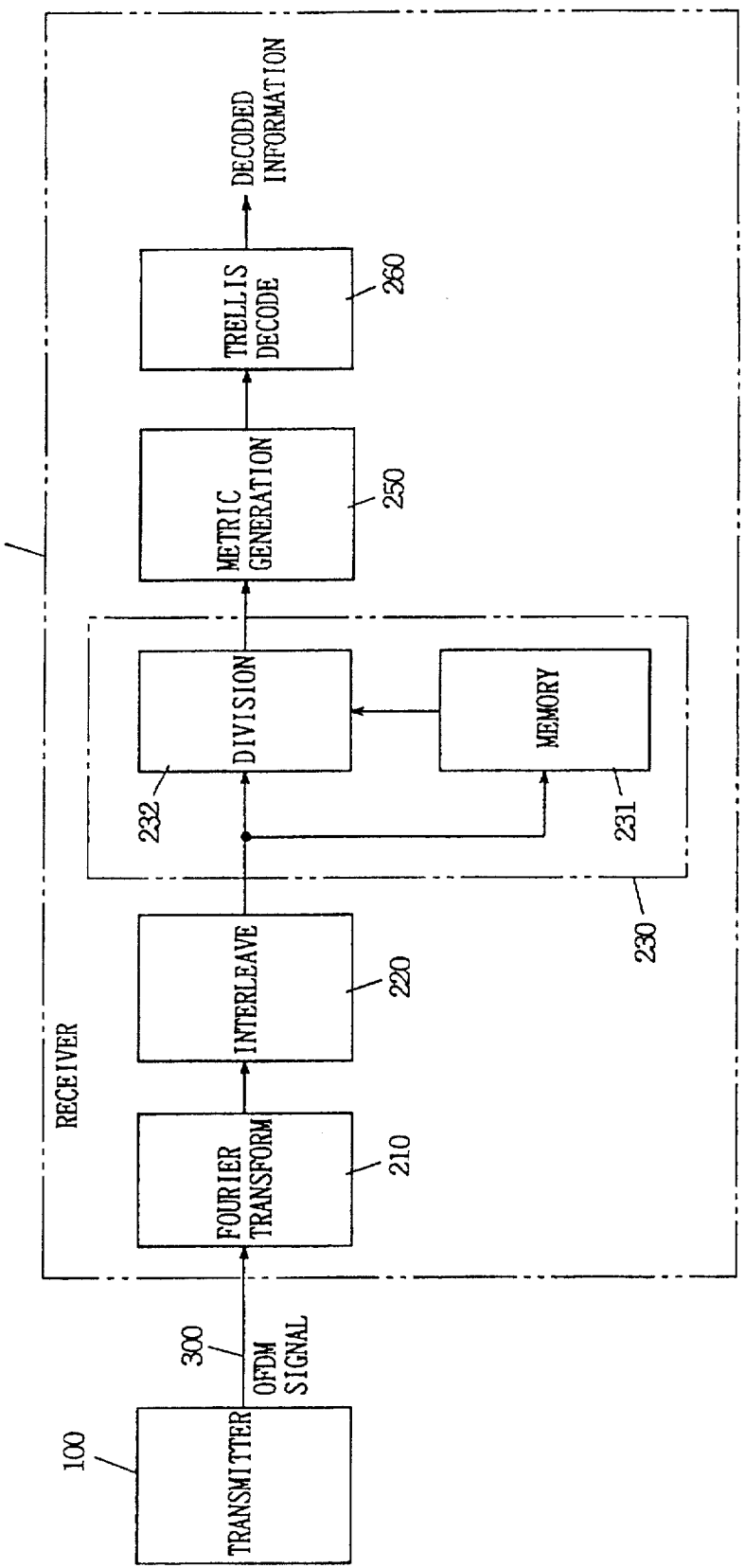
FIG. 2 is a block circuit diagram showing the whole structure of a conventional system.

Accordingly, even if the characteristic of the transmission channel 3 is degraded by fading and the like, the noise elements are not amplified, which is unlike the conventional art. Furthermore, an increase of the error included in the branch metric can be prevented and the decoding performance will not be degraded in the trellis decode circuit 26. This is due to the fact that the receiver 200 in FIG. 2 of the conventional art uses division with respect to the demodulation part, while the receiver 2 in FIG. 1 of the present invention does not use division.

While the present invention has been described in detail, the foregoing description is in all aspects illustrative and not restrictive. It is understood that numerous other modifications and variations can be devised by one having ordinary skill in the art without departing from the scope of the invention.

What is claimed is:

1. A method of receiving an orthogonal frequency division multiplexed signal from a transmission channel, wherein the orthogonal frequency division multiplexed signal is formed at a transmitting side by incorporating a data sequence into a vector sequence having at least one precedent symbol which represents an amplitude and phase reference, thereby generating a transmission reference vector sequence, modulating the transmission reference vector sequence using a transmission modulation vector sequence which is trellis-coded such that the data sequence is distributed to any one of a plurality of signal points using a prescribed modulation scheme, thereby generating a transmission vector sequence, and multiplexing the transmission vector sequence as a plurality of modulated waves which are orthogonal to each other, thereby forming the orthogonal frequency division multiplexed signal which is transmitted through the transmission channel, said method comprising:

Fourier transforming the orthogonal frequency division multiplexed signal obtained from the transmission channel for each of the at least one precedent symbol so as to produce a received vector sequence and a received reference vector sequence in frequency domains which correspond to those of the transmission vector sequence and the transmission reference vector sequence, respectively;

storing the received reference vector sequence produced by said Fourier transforming step;

modulating the received reference vector sequence stored by said storing step with respective signal point vectors which represent each of the signal points to thereby generate a modulation vector sequence for each of the at least one precedent symbol;

generating a branch metric sequence by obtaining a difference between the received vector sequence generated by said Fourier-transforming step and the modulation vector sequence generated by said modulating step; and trellis decoding the branch metric sequence generated by said generating step so as to reproduce the data sequence.

2. The method according to claim 1, wherein the transmitting side interleaves orders of elements of the transmission vector sequence and the transmission reference vector sequence, said method further comprising:

interleaving orders of elements, corresponding to the orders interleaved on the transmitting side, of the received vector sequence and the received reference vector sequence generated by said Fourier transforming step.

3. A receiver capable of receiving an orthogonal frequency division multiplexed signal from a transmission channel, wherein the orthogonal frequency division multiplexed signal is formed at a transmitting side by incorporating a data sequence into a vector sequence having at least one precedent symbol which represents an amplitude and phase reference, thereby generating a transmission reference vector sequence, modulating the transmission reference vector sequence using a transmission modulation vector sequence which is trellis-coded such that the data sequence is distributed to any one of a plurality of signal points using a prescribed modulation scheme, thereby generating a transmission vector sequence, and multiplexing the transmission vector sequence as a plurality of modulated waves which are orthogonal to each other, thereby forming the orthogonal frequency division multiplexed signal which is transmitted through the transmission channel, said receiver comprising:

Fourier transforming means for performing a Fourier transform on the orthogonal frequency division multiplexed signal obtained from the transmission channel for each of the at least one precedent symbol so as to produce a received vector sequence and a received reference vector sequence in frequency domains which correspond to those of the transmission vector sequence and the transmission reference vector sequence, respectively;

storing means for storing the received reference vector sequence produced by said Fourier transforming means;

modulating means for modulating the received reference vector sequence stored by said storing means with respective signal point vectors which represent each of the signal points to thereby generate a modulation vector sequence for each of the at least one precedent symbol;

generation means for generating a branch metric sequence by obtaining a difference between the received vector sequence generated by said Fourier-transforming means and the modulation vector sequence generated by said modulating means; and decoding means for trellis decoding the branch metric sequence generated by said generating means so as to reproduce the data sequence.

4. The receiver according to claim 3, wherein the transmitting side interleaves orders of elements of the transmission vector sequence and the transmission reference vector sequence, said receiver further comprising:

interleaving means for interleaving orders of elements, corresponding to the orders interleaved on the transmitting side, of the received vector sequence and the received reference vector sequence generated by said Fourier transforming means.

* * * * *